United States Patent
Zschocke et al.

[15] 3,671,540
[45] June 20, 1972

[54] SUBSTITUTED HYDANTOINS

[72] Inventors: Albrecht Zschocke, 5 Berliner Strasse, 6702, Bad Duerkheim; Wolfgang Rohr, 19 Hebelstrasse, 6800, Mannheim; Adolf Fischer, 43 Speyerer Strasse 6704, Mutterstadt, all of Germany

[73] Assignee: Badische Anilin- & Soda-Fabrik Aktiengesellschaft, Ludwigshafen/Rhein, Germany

[22] Filed: March 13, 1970

[21] Appl. No.: 19,470

[30] Foreign Application Priority Data

March 18, 1969 Germany..................P 19 13 631.3

[52] U.S. Cl................................260/309.5, 71/92
[51] Int. Cl. .........................................C07d 49/32
[58] Field of Search..............................260/309.5

[56] References Cited

UNITED STATES PATENTS 3,448,116   6/1969   McCaully et al...................260/309.5

OTHER PUBLICATIONS

Coghill et al., J. Amer. Chem. soc., Vol. 47, pp. 188 relied on (1925). QD1.A5

FMC Corp., Chem. Abst., Vol. 64, column 8082 (1966). QD1.A51

Schloegel et al., Chem. Abst., Vol. 56, columns 7299- 301 (1962).

Zschocke et al., Chem. Abst., Vol. 71, No. 38969b (1969). QD1.A51

*Primary Examiner*—Natalie Trousof
*Attorney*—Johnston, Root, O'Keeffe, Keil, Thompson & Shurtleff

[57] ABSTRACT

Valuable hydantoins having the formula

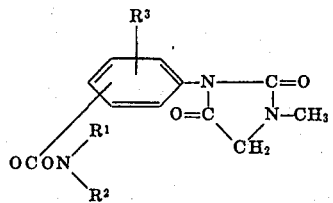

where $R^1$ denotes hydrogen or a lower alkyl group, $R^2$ denotes a saturated or unsaturated aliphatic radical which may be substituted by halogen, hydroxyl, alkoxy, cyano or alkylmercapto, and $R^3$ denotes hydrogen or the methyl group, and a process for controlling the growth of unwanted plants with these compounds.

5 Claims, No Drawings

SUBSTITUTED HYDANTOINS

The present invention relates to new and valuable substituted hydantoins are herbicides containing them.

It is known from German Pat. No. 1,018,261 and U.S. Pat. No. 3,134,663 to use hydantoins, e.g. the 1-methyl-3-(p-bromophenyl)-hydantoin, as herbicides; however, their action is not satisfactory.

We have found that hydantoins having the formula

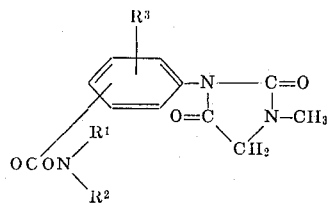

where $R^1$ denotes hydrogen or a lower alkyl group (methyl, ethyl, propyl, isopropyl), $R^2$ denotes a saturated or unsaturated aliphatic radical (methyl, ethyl, propyl, isopropyl, butyl, sec-butyl, isobutyl, tert-butyl, pentyl, hexyl, 1,3-dimethylbutyl, allyl, butyn-1-yl-3, methyl-3-butyn-1-yl-3) which may be substituted by halogen (chlorine, bromine), hydroxyl, alkoxyl (methoxy, ethoxy, propoxy, isopropoxy), cyano or alkylmercapto (methylmercapto, ethylmercapto), and $R^3$ denotes hydrogen or the methyl group, are valuable herbicidally active compounds.

The following data illustrate the preparation of the compounds according to the invention:

10.3 parts (by weight) of 1-methyl-3-(m-hydroxylphenyl)-hydantoin is suspended in 50 parts of dioxane to which 0.5 part of triethylamine has been added. 6 parts of tert-butyl isocyanate is added and the mixture subsequently heated for several hours under reflux. After cooling, the clear solution is freed from solvent and the residue recrystallized from isopropanol. 11.2 parts of 1-methyl-3-(m-tert-butylcarbamoyloxyphenyl)-hydantoin having a melting point of 140° C. is obtained.

1-methyl-3-(m-hydroxyphenyl)-hydantoin may be prepared by conventional processes from m-hydroxyphenylurea and sarcosine (v. Ber. 25, Ref. 328 (1892)). The remaining active ingredients may be prepared analogously.

The following compounds are examples of active ingredients according to the invention; the symbols correspond to the designations above.

| $R^1$ | $R^2$ | $R^3$ | m.p. |
|---|---|---|---|
| H | CH$_3$ | H | 140°C. |
| H | N-C$_4$H$_9$ | H | 196°C. |
| H | tert-C$_4$H$_9$ | H | 140°C. |
| H | —CH$_2$CH$_2$Cl | H | 177°C. |
| H | tert-C$_4$H$_9$ | 4-methyl | 168°C. |
| H | C$_2$H$_5$ | H | 120°C. |
| H | iso-C$_3$H$_7$ | H | 170°C. |
| H | cyclohexyl | H | 145°C. |
| H | CH$_2$—CH$_2$—S—CH$_3$ | H | 196°C. |

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e. g. tetrahydronaphthalene or alkylated naphthalenes, or organic liquids having boiling points higher than 150° C. and one or more than one functional group, e. g. the keto group, ether group, ester group or amide group, this group being attached as substituent to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e. g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g. diatomaceous earth, talc, clay or fertilizers. It is also possible to add insecticides, fungicides, bactericides, growth regulators and other herbicides.

The following Examples demonstrate the application of the active ingredients according to the invention.

EXAMPLE 1

Loamy sandy soil is filled into pots and sown with the seeds of wheat (Triticum sativum), barley (Hordeum vulgare), Indian corn (Zea mays), annual bluegrass (Poa annua), orchardgrass (Dactylis glomerata), slender foxtail (Alopecurus myosuroides), barnyard grass (Echinochloa crus-galli), chickweed (Stellaria media), wild mustard (Sinapis arvensis) and small nettle (Urtica urens). The soil prepared in this manner is then treated with 3 kg per hectare of each of the following active ingredients dispersed in 500 liters of water per hectare:

1-methyl-3-(m-tert-butylcarbamoyloxyphenyl)-hydantoin I;
1-methyl-3-(m-isopropylcarbamoyloxyphenyl)-hydantoin III;
1-methyl-3-(m-methylcarbamoyloxyphenyl)-hydantoin IV;
1-methyl-3-(m-cyclohexylcarbamoyloxyphenyl)-hydantoin V; and, for comparison,
1-methyl-3-(p-bromophenyl)-hydantoin II.

After 4 weeks it is ascertained that the compounds I, III, IV and V have a stronger herbicidal action than II.

The results of the experiment are given in the following table:

ACTIVE INGREDIENT

| | I | II | III | IV | V |
|---|---|---|---|---|---|
| Triticum vulgare | 0–10 | 10 | 5 | 0 | 5 |
| Hordeum vulgare | 10 | 10 | 10 | 5 | 10 |
| Zea mays | 0–10 | 10 | 0 | 0 | 5 |
| Poa annua | 90–100 | 70–80 | 85 | 80 | 80 |
| Dactylis glomerata | 90–100 | 70–80 | 90 | 85 | 80 |
| Alopecurus myosuroides | 90 | 70 | 80 70 | 75 | 75 |
| Echinochloa crus-galli | 90–100 | 60–70 | 75 | 70 | 70 |
| Stellaria media | 100 | | 90 | 86–90 | 85 |
| Sinapis arvensis | 90–100 | 80–90 | 95 | 90 | 85 |
| Urtica urens | 90–100 | 80–90 | 90 | 85 | 85 |

0 = no action
100 = total destruction

EXAMPLE 2

The plants wheat (Triticum sativum), barley (Hordeum vulgare), Indian corn (Zea mays), annual bluegrass (Poa annua),orchardgrass (Dactylis glomerata), slender foxtail (Alopecurus myosuroides), barnyard grass (Echinochloa crusgalli), chickweed (Stellaria media), wild mustard (Sinapis arvensis) and small nettle (Urtica urens) are treated at a growth height of 2 to 14 cm with 1.5 kg per hectare of each of the following active ingredients dispersed in 500 liters of water per hectare:

1-methyl-3-(m-tert-butylcarbamoyloxyphenyl)-hydantoin I;
1-methyl-3-(m-isopropylcarbamoyloxyphenyl)-hydantoin III;
1-methyl-3-(m-methylcarbamoyloxyphenyl)-hydantoin IV;
1-methyl-3-(m-cyclohexylcarbamoyloxyphenyl)-hydantoin V; and, for comparison,
1-methyl-3-(p-bromophenyl)-hydantoin II.

After 3 to 4 weeks it is ascertained that compound I, III, IV and V have a stronger herbicidal action than II.

The results of the experiment are given in the following table:

ACTIVE INGREDIENT

|  | I | II | III | IV | V |
|---|---|---|---|---|---|
| Triticum vulgare | 10 | 10 | 10 | 5 | 5 |
| Hordeum vulgare | 10–20 | 10–20 | 15 | 10 | 10 |
| Zea mays | 10 | 10 | 10 | 5 | 5 |
| Poa annua | 90–100 | 70–80 | 90 | 85 | 90 |
| Dactylis glomerata | 90–100 | 70–80 | 95 | 85 | 95 |
| Alopecurus myosuroides | 80–90 | 70 | 80 | 75 | 75 |
| Echinochloa crus-galli | 90 | 70 | 80 | 75 | 80 |
| Stellaria media | 90–100 | 80–90 | 95 | 90 | 95 |
| Sinapis arvensis | 90–100 | 80 | 90 |  | 85 |
| Urtica urens | 90–100 | 80–90 | 95 | 90 | 90 |

0 = no action
100 = total destruction

EXAMPLE 3

An experimental area is sown with annual bluegrass (Poa annua), orchardgrass (Dactylis glomerata), slender foxtail (Alopecurus myosuroides), barnyard grass (Echinochloa crus-galli), chickweed (Stellaria media), wild mustard (Sinapis arvensis) and small nettle (Urtica urens) and sprayed on the same day with 5 kg per hectare of 1-methyl-3-(m-tert-butylcarbamoyloxyphenyl)-hydantoin I and, for comparison, with 5 kg per hectare of 2-chloro-4,6-bis-(ethylamino)-s-triazine II, these amounts of the active ingredients each being dispersed in 500 liters of water per hectare. After 3 to 4 weeks it is ascertained that active ingredient I has completely withered the broadleaved and grassy weeds, whereas the weeds on that part of the area treated with active ingredient II are not yet fully withered.

EXAMPLE 4

An agricultural plot with annual bluegrass (Poa annua), orchardgrass (Dactylis glomerata), slender foxtail (Alopecurus myosuroides), barnyard grass (Echinochloa crus-galli), chickweed (Stellaria media), wild mustard (Sinapis arvensis) and small nettle (Urtica urens) growing on it is sprayed at a growth height of the weeds of 3 to 8 cm with 5 kg per hectare of 1-methyl-3-(m-tert-butylcarbamoyloxyphenyl)-hydantoin I and, for comparison, with 5 kg per hectare of 2-chloro-4,6-bis-(ethylamino)-s-triazine II, these amounts of the active ingredients each being dispersed in 500 liters of water per hectare. After 8 days the broadleaved and grassy weeds treated with active ingredients I are heavily damaged, whereas the plants sprayed with II still show normal growth. After 3 weeks almost all plants are completely withered.

The action of the following compounds corresponds to that of active ingredient I in Examples 3 and 4:
1-methyl-3-(m-cyclohexylcarbamoyloxyphenyl)-hydantoin;
1-methyl-3-(m-methylcarbamoyloxyphenyl)-hydantoin;
1-methyl-3-(m-isopropylcarbamoyloxyphenyl)-hydantoin.

EXAMPLE 5

60 parts by weight of compound I from Example 1 is mixed with 40 parts by weight of N-methyl-α-pyrrolidone. A mixture is obtained which is suitable for application in the form of very fine drops.

EXAMPLE 6

20 parts by weight of compound III from Example 1 is dissolved in a mixture consisting of 80 parts by weight of xylene, 10 parts by weight of the adduct of 8 to 10 moles of ethylene oxide to 1 mole of oleic acid-N-mono-ethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

20 parts by weight of compound IV from Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of compound V from Example 1 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 9

20 parts by weight of compound I from Example 1 is well mixed with 3 parts by weight of the sodium salt of diisobutyl-naphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 10

3 parts by weight of compound I from Example 1 is intimately mixed with 97 parts by weight of particulate kaolin. A dust is obtained containing 3 percent by weight of the active ingredient.

EXAMPLE 11

30 parts by weight of compound I from Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. A hydantoin having the formula

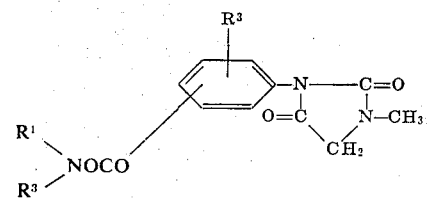

wherein $R^1$ denotes hydrogen or lower alkyl, $R^2$ denotes lower alkyl, cyclohexyl, or lower alkyl substituted with halo, hydroxy, lower alkoxy or lower alkylmercapto, and $R^3$ denotes hydrogen or methyl.
2. 1-methyl-3-(m-tert-butylcarbamoyloxyphenyl)-hydantoin.
3. 1-methyl-3-(m-isopropylcarbamoyloxyphenyl)-hydantoin.
4. 1-methyl-3-(m-methylcarbamoyloxyphenyl)-hydantoin.
5. 1-methyl-3-(m-cyclohexylcarbamoyloxyphenyl)-hydantoin.

* * * * *

PO-1050
(5/69)

UNITED STATES PATENT OFFICE
CERTIFICATE OF CORRECTION

Patent No. 3,671,540    Dated June 20, 1972

Inventor(s) ALBRECHT ZSCHOCKE, WOLFGANG ROHR, and ADOLF FISCHER

It is certified that error appears in the above-identified patent and that said Letters Patent are hereby corrected as shown below:

Col.1, line 9 reads ...have found... and should read --have now found--

Col.1, line 49 (under $R^2$) reads ...$N-C_4H_9$ instead of --$n-C_4H_9$.

Col.2, line 46 reads: Alopecurus myosuroides  90  70  80 70  75  75
    instead of Alopecurus myosuroides 90  70  80      75  75

Col.2, line 48 reads: Stellaria media  100                90 80-90  85
    instead of Stellaria media 100 80-90  90  85        85

Col.2, line 62 - 1st word: "crusgalli" should read "crus-galli"

Col.3, line 15 -reads:
    Sinapis arvensis  90-100  80  90           85'
instead of:
    Sinapis arvensis  90-100 80-90  90  85 85  -- .

Signed and sealed this 25th day of December 1973.

(SEAL)
Attest:

EDWARD M. FLETCHER, JR.           RENE D. TEGTMEYER
Attesting Officer                 Acting Commissioner of Patents